Nov. 26, 1929. R. E. BISSELL Re. 17,499

POPPET VALVE

Original Filed Aug. 2, 1926

INVENTOR:
RICHARD E. BISSELL
BY
A. E. Merkel,
ATTORNEY.

Reissued Nov. 26, 1929

Re. 17,499

UNITED STATES PATENT OFFICE

RICHARD E. BISSELL, OF CLEVELAND, OHIO, ASSIGNOR TO THOMPSON PRODUCTS, INC., OF CLEVELAND, OHIO, A CORPORATION OF OHIO

POPPET VALVE

Original No. 1,615,211, dated January 25, 1927, Serial No. 126,353, filed August 2, 1926. Application for reissue filed January 26, 1929. Serial No. 335,333.

This invention relates to valves such as are employed in internal combustion engines, commonly referred to as "poppet" valves, and more particularly to exhaust valves.

Such valves consist of a head provided with a seat fitted accurately to the seat of an exhaust port of the engine cylinder and a stem having a sliding bearing in a part of the engine structure. The valve is ordinarily pressed to its seat by a strong spring. In order to lift it from its seat to permit passage of exhaust gases a tappet rod or arm is mounted for engagement with the end of the stem, the tappet being associated with a rotating cam for periodical engagement therewith. The valve head and stem are subjected to conditions of heat which vary with the speed of the engine and other conditions. In the ordinary construction the valve stem expands as the temperature rises and its end moves toward the tappet. While there are other features which tend to move the end of the stem in the opposite direction such movement is much less than the movement toward the tappet. Therefore, unless considerable clearance is provided between the end of the stem and the tappet when the engine is cold or running under light load the expansion of the stem when the engine is hot will lift the valve from its seat. As this condition must necessarily be avoided the required clearance is provided, in consequence of which a great deal of noise results from such a loose connection except when the engine is hot. The ideal condition would be that in which the expansion of the valve is compensated for at all engine temperatures, thus permitting the same clearance at all stages of engine operation.

The object of this invention is to remove or substantially reduce the noise incident to such a loose connection between the tappet and valve stem.

The attainment of this object has been attempted heretofore by employing special alloys for the stem or portions thereof having a coefficient of expansion differing from that of the head or other portions of the stem, but such means has been found unsatisfactory.

By utilizing a different principle I have much more effectively attained this object. The new principle involves expanding or mechanically stressing the head and causing it to ride upon its tapered seat sufficiently to draw the stem longitudinally to substantially the same extent that its length increases with each increment of temperature. This I accomplish by providing the head with an insert of material having a greater coefficient of expansion than the main body of the head, whereby the whole head is enlarged in diameter but within the elastic limit.

For the purpose of exemplifying the principle of the invention, I disclose herein one form in which I have embodied and tested the invention, which is the best form now known to me.

Figure 1:
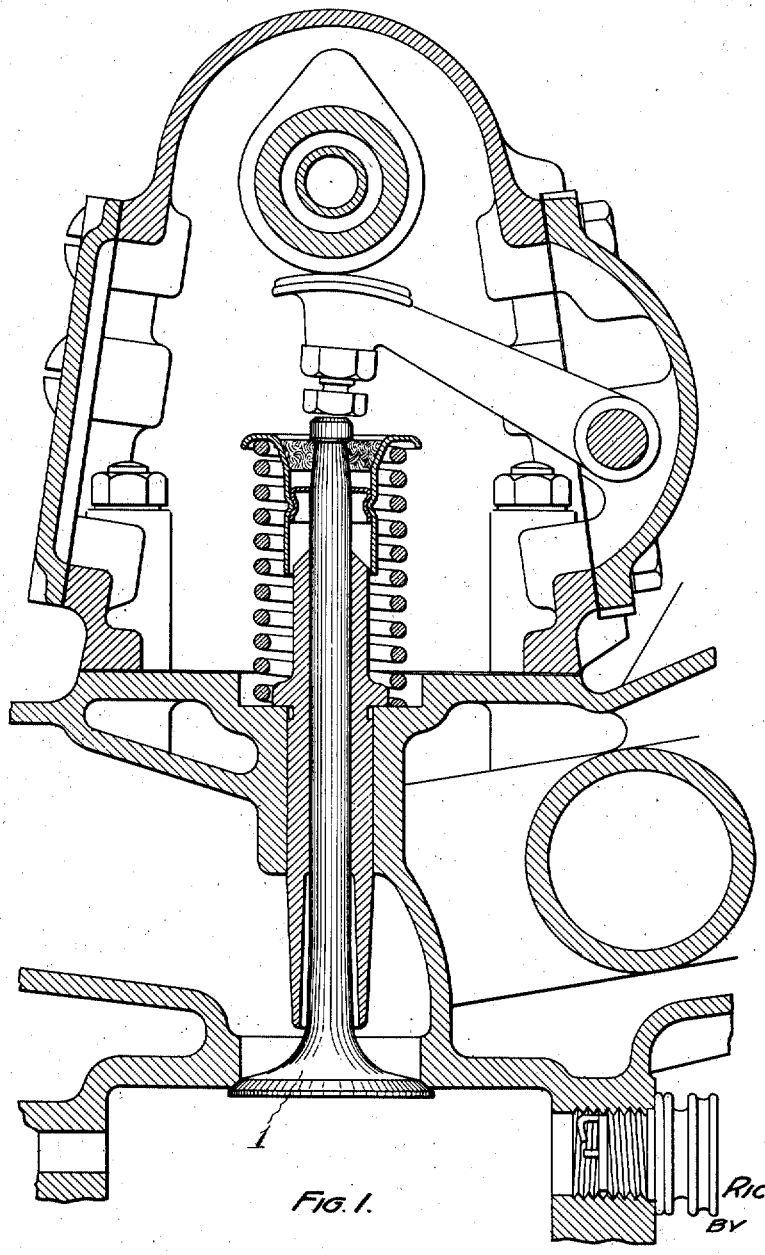
Figure 1 is a vertical sectional view through the engine structure in which my invention has been embodied, showing my valve in side elevation.
Figure 2:
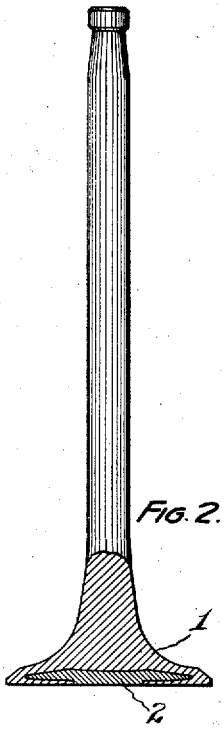
Figure 2 is an elevation of the valve alone showing the head in cross-section.

My novel valve is shown in the drawings as forming part of an eight cylinder overhead valve structure of an old and well known construction, so that it is unnecessary to describe in detail any of the engine features.

In accordance with my improvement I provide a valve head 1 of well known form with an insert 2 of material having a higher coefficient of expansion than the main body of the head. The material selected for the insert will depend upon the nature of the material of the main body of the head and of the stem, upon the relative proportion of the head and insert, upon the degree of taper to the valve seat, and upon the characteristics of the engine structure and of the relation of the cooling medium thereto. Ordinarily the materials of the valve head must be calculated for each engine structure. For an engine of the construction shown in the drawings, I have found an efficient embodiment of my invention in a valve made of the following materials and proportions:

Composition of insert-alloy steel:
C., 0.35; Cr., 12.0; Si, 2.0; Ni., 7.5; iron and impurities, 78.15.

Composition of valve head and stem-alloy steel:
C, 0.45; Cr., 8.25; Si., 3.25; iron and impurities, 88.05.

The coefficient of expansion of an insert of such composition is .000010 inch per degree F. and of the valve head and stem .00000703 inch per degree F.

The fabrication of the valve head may be effected in different ways, but I have discovered an economical and effective process for producing such a product, which forms the subject matter of a concurrently filed application, Serial No. 126,355. Briefly described this process consists in forming a recess in the upper end of a blank adapted to form the valve head and stem, filling the recess either partially or wholly with the material of the insert, and then upsetting the end in suitable dies according to known practice, whereby the head is flattened, and the material of the blank is caused to surround, in whole or in part, the material of the insert.

While I have described but one embodiment of the invention, it is obvious that the materials may be varied for the same situation and that different situations or engine structures require changes to meet the particular conditions. It is therefore to be understood that the disclosure herein is merely exemplary of the principle involved and that my invention comprehends all changes and modifications falling within the terms of the appended claims.

What I claim is:

1. As an article of manufacture, a valve head provided with a tapered seat and an insert having a greater coefficient of expansion than the main body of the head, adapted to compensate for the extension of the valve stem due to increasing temperatures.

2. As an article of manufacture, a valve head having a tapered seat and whose main body portion is of silicon chromium steel provided with an insert of alloy steel containing nickel, said insert having a greater coefficient of expansion than the main body of the head.

3. In combination with an internal combustion engine having an exhaust port with a tapered seat, a poppet valve with a tapered seat fitting into the tapered seat of the exhaust port, the head of the valve being provided with an insert of material having a coefficient of expansion greater than the main body of the head.

4. As an article of manufacture, a headed member comprising a stem, a head thereon, and an insert in said head of a material having a coefficient of expansion greater than that of the head proper for compensating for the expansion of a portion of said member.

5. As an article of manufacture, a headed member comprising a stem, a head thereon, and an insert of alloy steel containing nickel in said head having a coefficient of expansion greater than that of the head proper for compensating for the expansion of a portion of said member.

6. As an article of manufacture, a headed member comprising a stem, a head thereon including a tapered seat portion, and an insert in said head having a greater coefficient of expansion than that of the head proper and arranged to compensate for the extension of the stem due to increasing temperatures.

7. As an article of manufacture, a headed member comprising a stem, a head thereon, and an insert in said head separate from the head and stem and possessing characteristics different from that of the head proper and which has been flattened and interlocked with the head during the forming of the head.

8. As an article of manufacture, a headed member comprising a stem, a head thereon, and an insert disposed wholly within said head including a relatively thin lateral portion extending toward the peripheral edge of said head and which has been interlocked with the head during the forming of the head.

In testimony whereof I have hereunto subscribed my name at Cleveland, Cuyahoga County, Ohio.

RICHARD E. BISSELL.